US 9,020,860 B2

(12) United States Patent
Guyett et al.

(10) Patent No.: US 9,020,860 B2
(45) Date of Patent: Apr. 28, 2015

(54) AUTOMATED MAIL CREATION AND PROCESSING SYSTEM

(75) Inventors: Valentino Guyett, Olympia, WA (US); William Greenway, Grass Lake, MI (US); Marc Grimm, Sacramento, CA (US); Roger B. Hosler, Tequesta, FL (US)

(73) Assignee: Pitney Bowes Inc., Stamford, CT (US)

( * ) Notice: Subject to any disclaimer, the term of this patent is extended or adjusted under 35 U.S.C. 154(b) by 1200 days.

(21) Appl. No.: 12/629,786

(22) Filed: Dec. 2, 2009

(65) Prior Publication Data

US 2010/0145883 A1 Jun. 10, 2010

Related U.S. Application Data

(63) Continuation of application No. 11/222,265, filed on Sep. 8, 2005, now Pat. No. 7,644,004.

(60) Provisional application No. 60/608,402, filed on Sep. 9, 2004.

(51) Int. Cl.
| G06Q 30/00 | (2012.01) |
| G07B 17/00 | (2006.01) |
| G06Q 10/08 | (2012.01) |
| G07C 13/00 | (2006.01) |

(52) U.S. Cl.
CPC ........ *G07B 17/00467* (2013.01); *G06Q 10/083* (2013.01); *G07B 2017/00491* (2013.01); *G07B 2017/00701* (2013.01); *G07C 13/00* (2013.01)

(58) Field of Classification Search
CPC ........... G06Q 10/083; G07B 17/00467; G07B 2017/00491; G07B 2017/00701

USPC .............................................................. 705/1
See application file for complete search history.

(56) References Cited

U.S. PATENT DOCUMENTS

| 4,354,631 | A | | 10/1982 | Stevenson | |
| 4,615,480 | A | * | 10/1986 | Powell | 229/71 |
| 4,741,475 | A | * | 5/1988 | Norman | 229/71 |
| 5,031,382 | A | * | 7/1991 | Boyle | 53/411 |
| 5,169,061 | A | | 12/1992 | Buescher | |
| 5,588,621 | A | * | 12/1996 | Collins et al. | 248/27.1 |
| 6,557,755 | B1 | * | 5/2003 | Pickering et al. | 235/376 |
| 7,240,835 | B2 | | 7/2007 | Brucker et al. | |
| 2001/0032881 | A1 | * | 10/2001 | Wells et al. | 235/385 |
| 2003/0034393 | A1 | | 2/2003 | Chung | |
| 2003/0177021 | A1 | * | 9/2003 | Dutta | 705/1 |
| 2004/0041017 | A1 | * | 3/2004 | McClure | 235/375 |
| 2004/0046021 | A1 | | 3/2004 | Chung | |
| 2005/0263594 | A1 | | 12/2005 | Onischu | |
| 2007/0248248 | A1 | | 10/2007 | Brucker et al. | |

* cited by examiner

*Primary Examiner* — Allen J Jung
(74) *Attorney, Agent, or Firm* — Michael J. Cummings; Charles R. Malandra, Jr.; Steven J. Shapiro

(57) ABSTRACT

A system and method for preparing mail packages to be sent to recipients includes a carrier envelope with a front address window and a back window. A content document having a style code printed on it is positioned at the back of the carrier envelope. The content style code is positioned to be visible through the back window of the carrier envelope. A reply envelope is enclosed with an address area aligned with the front window of the carrier envelope. Mail packages are prepared by storing a corresponding content style for the recipient. While transported, the content style code is scanned. From the style code, a recipient having the corresponding content style is selected from the stored list. That recipients name and address are printed onto the address area of the reply envelope.

30 Claims, 17 Drawing Sheets

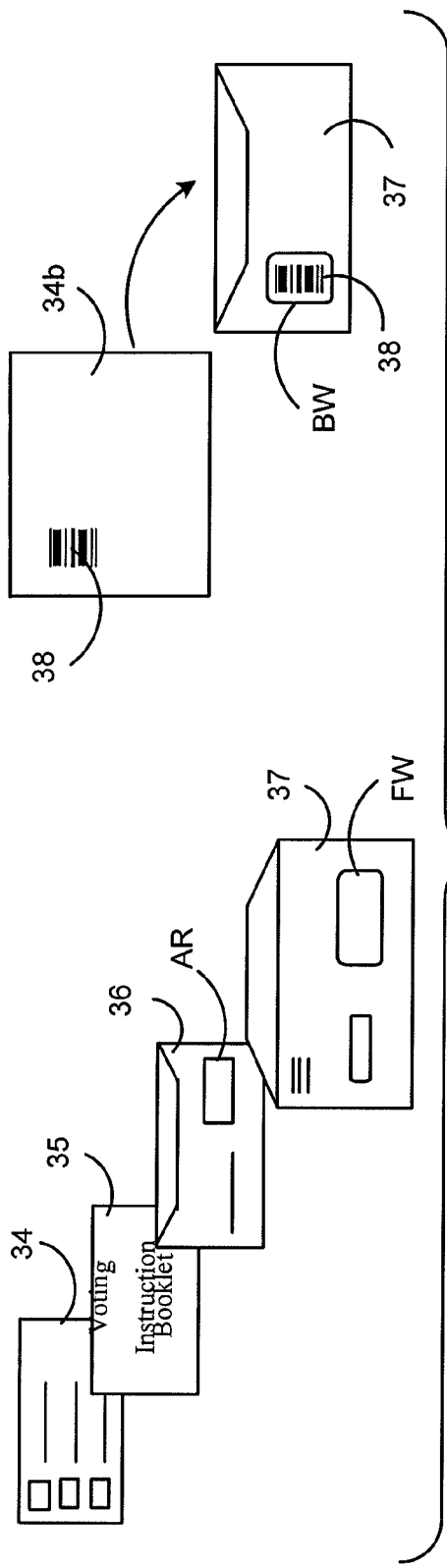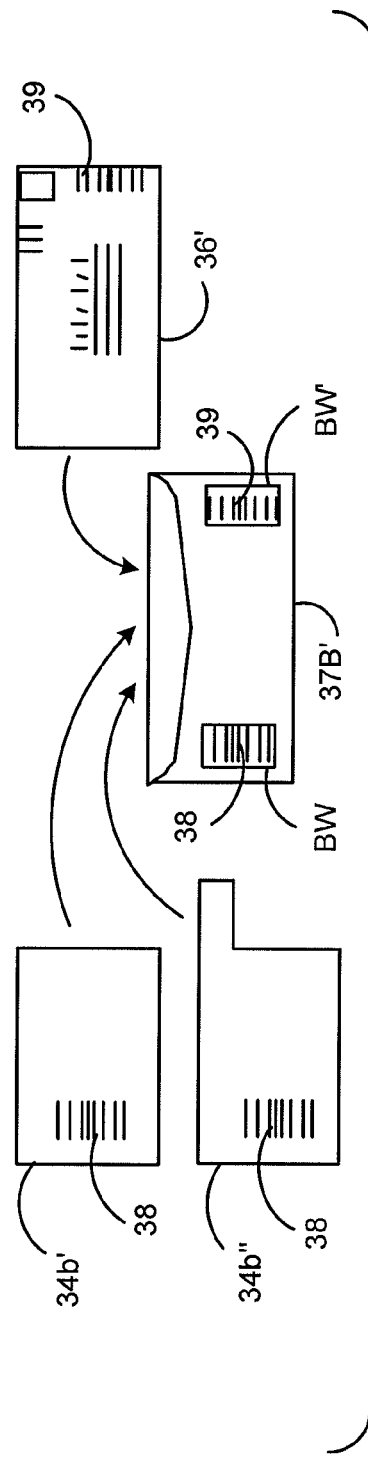
FIG. 3A
FIG. 3B

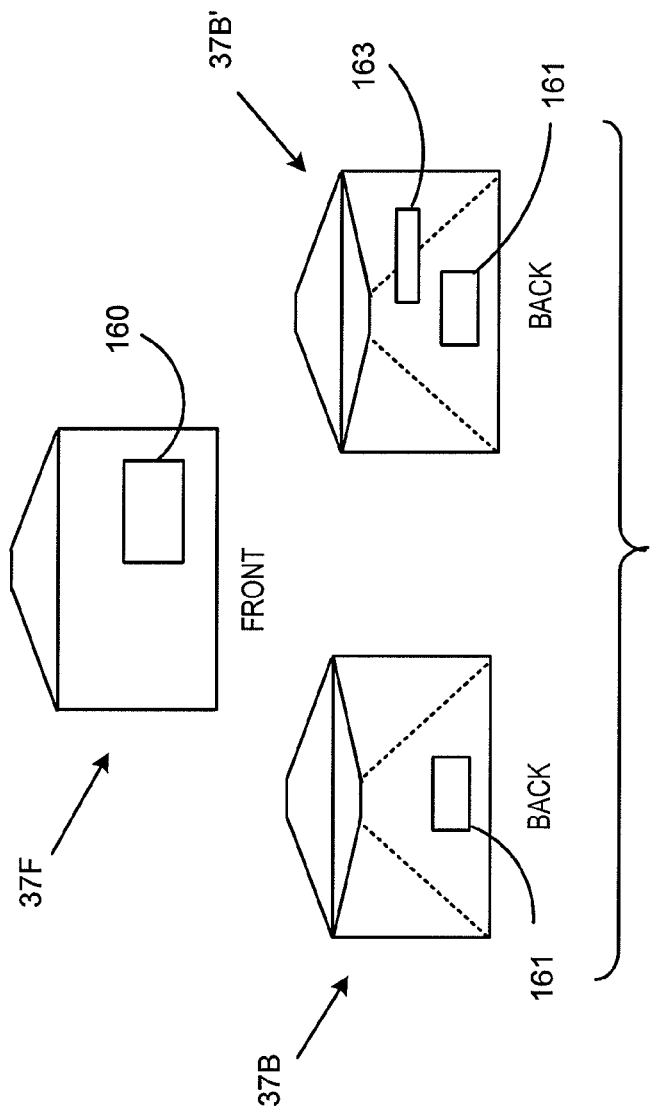

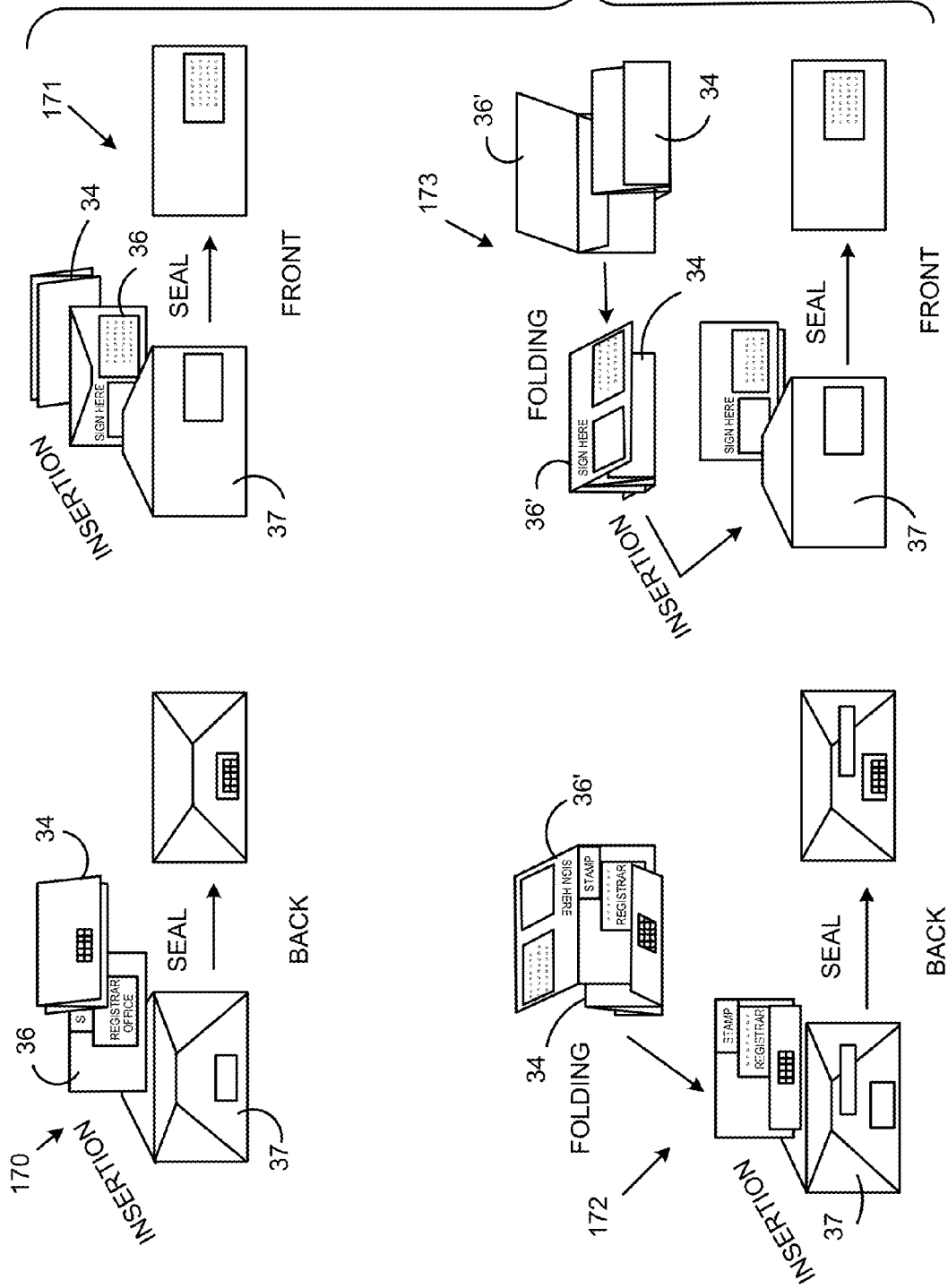

AUTOMATED MAIL CREATION AND PROCESSING SYSTEM

RELATED APPLICATION

The benefit of priority is claimed under 35 U.S.C. §120 of U.S. patent application Ser. No. 11/222,265, filed Sep. 8, 2005, entitled Automated Mail Creation and Processing System, which claims the benefit of priority under 35 U.S.C. §119 of U.S. Provisional Patent Application No. 60/608,402, filed Sep. 9, 2004, entitled Automated Mail Creation and Processing System with Verifiable Integrity, both of which are incorporated by reference herein in their entirety.

TECHNICAL FIELD

The present invention relates to preparing mail pieces for delivery, in particular to satisfy requirements for mail contents that cannot include information identifying the intended recipient, for example as in a vote-by-mail system.

BACKGROUND OF THE INVENTION

Voting by mail is becoming increasingly popular. Several western States use voting by mail as their primary method of voting. Voting by mail is also used extensively in connection with absentee voting. For voting by mail, a ballot package needs to be prepared by the voting authority and sent to the voter in advance of election day. The ballot package typically includes a ballot, some instructions, and a return envelope to send the ballot back in. The ballot package may also include a sample ballot and a security envelope. Different districts require different candidates/measures on the ballot. Also, within a district ballots are required for different language, different precincts, and rotation of vote choices.

To maintain voter privacy and anonymity, the ballots themselves must not include any way to identify the voter. However, there must be some way to verify that the vote came from the individual authorized to cast the absentee vote. For this purpose, the return envelope is typically signed. The signature on the envelope is compared to the signature of record for the voter to determine whether the absentee ballot can be validly counted. Once the return envelope is validated, the ballot can be removed and counted separately.

In the past, much of the work in preparing ballot package to send to voters has been done manually. Also, much of the work of receiving, validating and counting returned ballots has also been done manually. Such work has been costly, time consuming, and sometimes less reliable than desired. Some attempts at automating the processes have been tried. For example, U.S. patent application US 2004/0041017, filed Mar. 4, 2004, (incorporated herein by reference) describes some of the difficulties and solutions for voting by mail processes.

SUMMARY OF THE INVENTION

The present invention overcomes disadvantage of the conventional methods and systems by providing making the voting by mail process more efficient and cost effective. Also, ballot packages can be processed more reliably and with greater accuracy, security, integrity, accountability and auditability. Automated processes also provide some additional privacy, because fewer people need access to voter ballots.

It should be noted that the preferred embodiments of the invention are directed to preparing ballots, and accompanying materials, to be mailed to voters and returned to the voting authority for processing and counting. However, instead of ballots, the methods and systems disclosed herein can be applicable to any kind of document. It is believed that the system is most useful for systems where the mail content includes documents, such as a ballot, that, by their nature, do not include recipient information on them. Accordingly, it should be understood that even though voting-by-mail is the preferred application for the system described herein, the system can be used to mail any kind of documents substituted for ballots.

Accordingly, the present invention provides a method for preparing mail packages to be sent to recipients. The package includes a carrier envelope with an open front address window and a back window. A content document, such as a ballot, within the carrier envelope is positioned at the back of the carrier envelope. The content document has a content style code printed on it. The content style code is positioned on the content document so that it is visible through the back window of the carrier envelope. A reply envelope is also within the carrier envelope positioned at the front. The reply envelope has a recipient address area aligned with the front address window of the carrier envelope.

Steps for preparing the mail packages include storing a list of recipients and for each recipient storing a corresponding content style for the recipient. The prepared mail packages are moved along a transport for processing. While transported, the content style code is scanned through the back window. Based on the style code, a recipient having the corresponding content style is selected from the stored list. That recipients name and address are printed onto the address area of the reply envelope through the address window on the front of the carrier envelope.

In the preferred embodiment, the mail package is assembled with an inserting machine. The step of inserting is done independently of any determination of the recipient to whom the mail package will be sent.

Mail tracking information may be included on the mail package. For example, an inbound identifier code may be printed on the front face of the reply envelope. Also, an identifier code for the recipient can be positioned to be read from the reply envelope. That identifier can be compared to the style code to ensure that the recipient is receiving the right content (ballot) style.

To further ensure integrity, the method may include a step of measuring a thickness of the mail package, or weighing it, and if a thickness, or weight, of the mail package does not comply with predetermined criteria, then outsorting the non-compliant mail package.

For auditability, the method may further include a step of capturing and storing an image of the front face of the mail package after the printing step. Capturing the image also allows a step of verifying that the recipient name and address information in the captured image match an expected set of information for that mail package.

Further details of the present invention are provided in the accompanying drawings, detailed description, and claims.

BRIEF DESCRIPTION OF THE DRAWINGS

FIGS. 3A and 3B depict components of a mailpiece arranged for use in the enhanced mailing system.

FIG. 16 depicts an arrangement of carrier envelope components for use with enhanced tracking capabilities.

FIG. 17 depicts assembly of mail piece components for enhanced tracking capabilities.

DETAILED DESCRIPTION

Figure 1:
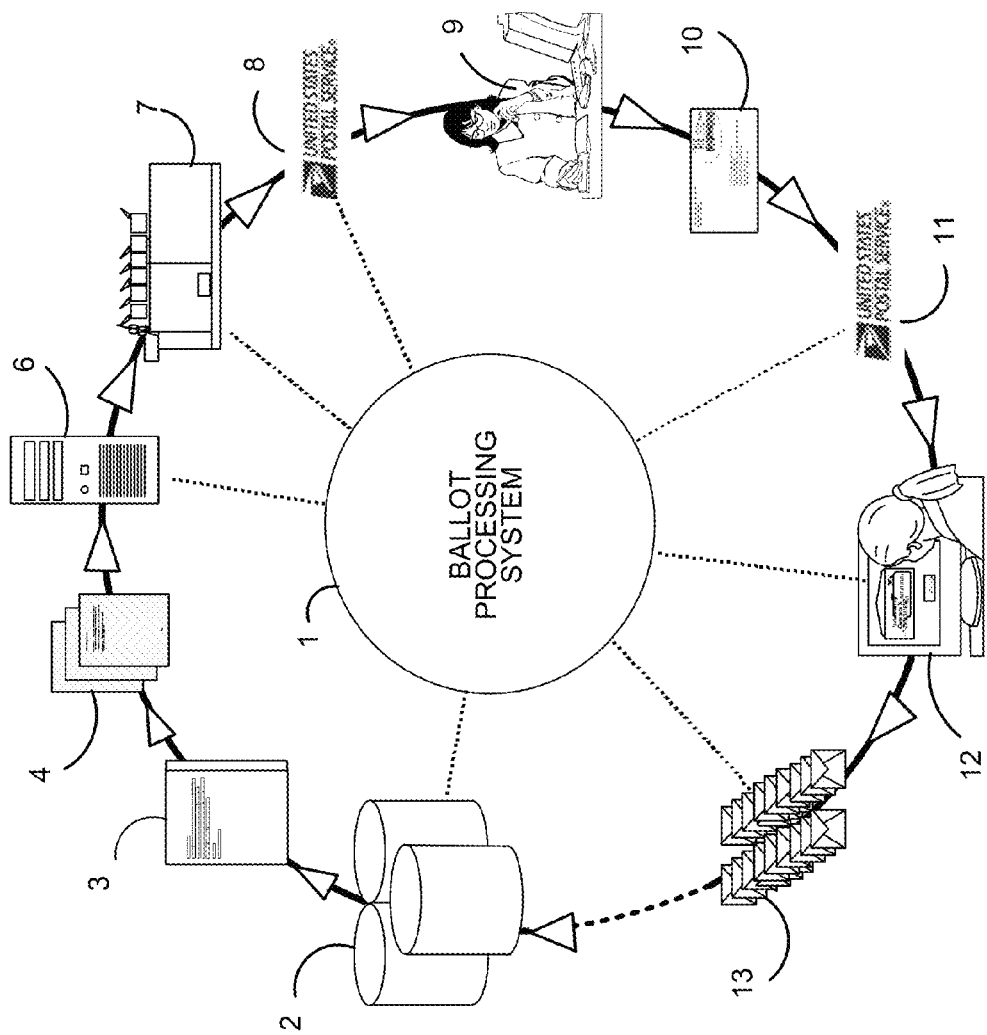
FIG. 1 depicts a lifecycle for a vote-by-mail system relevant to a ballot processing system described herein.

The improved ballot processing system includes complementary features that are useful for many different aspects of an absentee voter, or vote-by-mail, system. FIG. 1 shows an exemplary voting by mail activity cycle, and suggested areas where the ballot processing system 1 can enhance the processes. The vote-by-mail process begins with creation of electronic voter files 2. Voter files 2 include voters' names, addresses, precincts, voter ID, and types of ballots to be used for the particular votes. Another step is ballot composition 3, whereby the different ballots are created listing the candidates, and/or ballot measure, in a style suitable for the voters. Different voters in different precincts may be required to receive different format ballots, and often in different languages. After ballot composition 3, the ballots are printed via ballot printing step 4.

Next, mail preparation software 6 can be used to update address lists, or to put voter mailing addresses into a preferred postal format. At step 7, the ballots and accompanying materials are assembled and inserted into envelopes to be transported by the United States Postal Service (USPS) 8 to the voter 9. The voter 9 indicates her voting choices on the ballot and places it in the provided return envelope 10. At step 11, the USPS returns to ballot to the voting authority. At step 12, the voting authority receives and verifies the ballots to be opened, sorted, counted and tallied in step 13. Any changes to voter information or preferences as part of the voting-by-mail process can be used to update the voter files 2.

File Preparation

Figure 2:
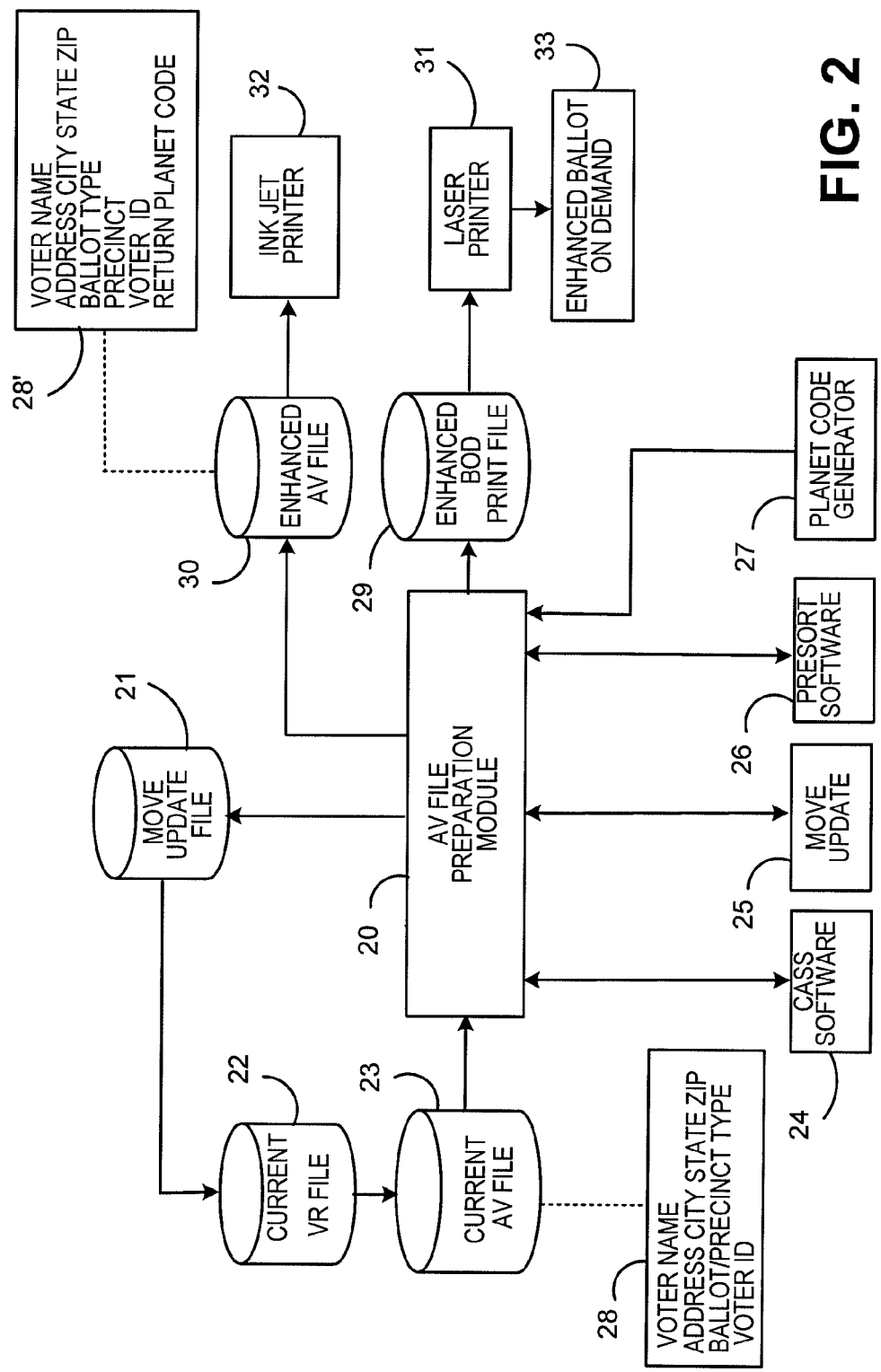
FIG. 2 depicts a system for preparing voter computer files for use with an enhanced mailing system.

FIG. 2 depicts a voter file preparation module 20 to prepare voter records for use with the present invention. FIG. 2 refers to an "AV file" which stands for "absentee voter" file. In this description, "absentee voting" is meant to describe voting by ail, whether it is done by just a few voters, or if it is the exclusive method of voting. Voter file preparation module 20 is a software package that uses various modules 24-27 to modify the current AV file 23 to provide maximum accuracy and to take advantage of additional efficiencies. The enhanced ballot on demand print file 29 and the enhanced AV file 30 are the end products of file preparation module 20 that will be used to control the equipment that will be preparing the ballot packages.

The current AV file 23 typically includes data 28 for voters in the jurisdiction. Data 28 might typically include voter name, address, ballot style, precinct, and voter ID. Different precincts most likely require a variety of different format ballots to be provided to the voter. Also, different ballot styles may be necessary for different languages required by voters.

The CASS software module 24 includes software to standardize addresses to conform with postal regulations, and appends zip+4 zip codes. The standardized and enhanced addresses (along with the rest of the enhanced data) are filed in the enhanced AV file 30, so that the cleansed addresses can be applied to the mail with an ink jet printer 32 connected to the mail preparation equipment.

A move update module 25 checks the voter file 23 against the USPS database of people who have moved. If the move update module 25 finds that an individual has moved, then the file preparation module 20 creates a move update file 21 to provide to the voting authority. The voting authority can then use the move update file to amend its current voter registration file 22, which in turn will modify the current absentee voter file 23.

Presort software module 26 can rearrange the list of voters so that mail going to voters in proximal postal delivery areas, such as the same zip code, can be prepared together. Thus, using the presort software module 26, presorted batches of created mail can meet postal regulations in order to receive postage discounts. Based on the presort software 26, the enhanced AV file may include flags to indicate priorities for grouping the creation of mail pieces.

The PLANET code generator 27 is used to create one or more unique barcodes to be associated with the voter identification and the enhanced voter file 30. PLANET codes are proprietary USPS barcodes that are used to track mail pieces as they travel through the postal delivery system. In a first embodiment, the enhanced AV file 30 is updated to include a return PLANET code (see exemplary enhanced AV file 28'), that will allow tracking of the return mail piece from the voter back to the voting authority. In another embodiment, discussed in connection with FIGS. 14-17, associated unique PLANET codes are applied to the mail piece for tracking the ballot on its outbound trip to the voter, and on the inbound return trip.

The present invention is preferably used in connection with a "ballot on demand" system. In such a system AV file preparation module 20 identifies how many of each style of ballot are required to satisfy the list of absentee voters from current AV file 23. An enhanced BOD (ballot on demand) file is created identifying the exact number of ballots of each style that need to be created. A laser printer 31 can be used by the voting authority to create the ballots 33.

A ballot on demand system is preferred to older style systems in which the voting authority would order estimated quantities of ballots of all the different styles from an offset printer. In order not to run out of ballot styles under the old system, extras had to be ordered, often leading to many wasted ballots and other materials. Also, if it is determined that if an error occurred in creating a voter's ballot package, then the appropriate new materials can be easily printed on demand to make a new package.

Ballot Package Components

FIG. 3A depicts the components of a ballot mail piece that is formed in accordance with the present invention. A ballot 34, instructions 35, and a reply envelope 36 are inserted into carrier envelope 37. Preferably, the back of the reply envelope 36 is inserted so that an address region AR on the back of reply envelope 36 shows through front window FW of the carrier envelope 37. The ballot 34 is positioned next to the back side of the carrier envelope 37. As seen in view 34B in FIG. 3A, the back of the ballot 34B includes a barcode 38. Barcode 38 indicates the style of ballot 34. As mentioned previously, it is important that ballot 34 cannot have any marking on it that can associate the particular ballot with the voter to whom it is being sent. When the ballot 34 is folded and placed in its rear position within the carrier envelope 37, the style code 38 is visible through back window BW on the back side 37B of the carrier envelope.

In FIG. 3B, a front view of reply envelope 36' is shown along with a back view of carrier envelope of 37B'. FIG. 3B shows a mail piece arrangement that allows an enhanced tracking feature that is not include in FIG. 3A. In addition to a first back window BW, carrier envelope 37B' further includes a second back window BW'. As in FIG. 3B, the first back window BW allows the style code 38 of the ballot 34 to show through. The second back window BW' allows an additional barcode 39 on the front of the reply envelope 36' to show through. For both barcodes 38 and 39 to show through their respective windows, the carrier envelope 37B' must be wider than both the reply envelope 36' and the ballot 34. As seen in FIG. 3B the reply envelope 36' must be positioned to the far right side of envelope 37B' while the ballot 34 must be positioned to the far left side, and the two envelope contents will only partially overlap each other.

Barcode 39, of the embodiment in FIG. 3A, preferably includes PLANET code data. This PLANET code data will allow the reply envelope 36' to be tracked as it returns through the postal system to the voting authority. As will be described further in connection with FIG. 8, the barcode 39 is scanned after the completed ballot package is formed and the barcode 39 information is associated and stored with the corresponding voter information.

This inbound tracking code can give the voting authority advanced notice of quantities of incoming return ballots. This notice can assist in planning staffing and schedules for personnel to count the ballots. Fraud detection is an additional benefit of this tracking scheme. If the number of tracked mail pieces does not match the number of ballots counted, then there is likely a problem that needs to be investigated. For example, if one thousand ballots were tracked in the mail, but only eight hundred were processed and accounted for, then a problem may have occurred.

Outbound Ballot Package Processing

Figure 4:
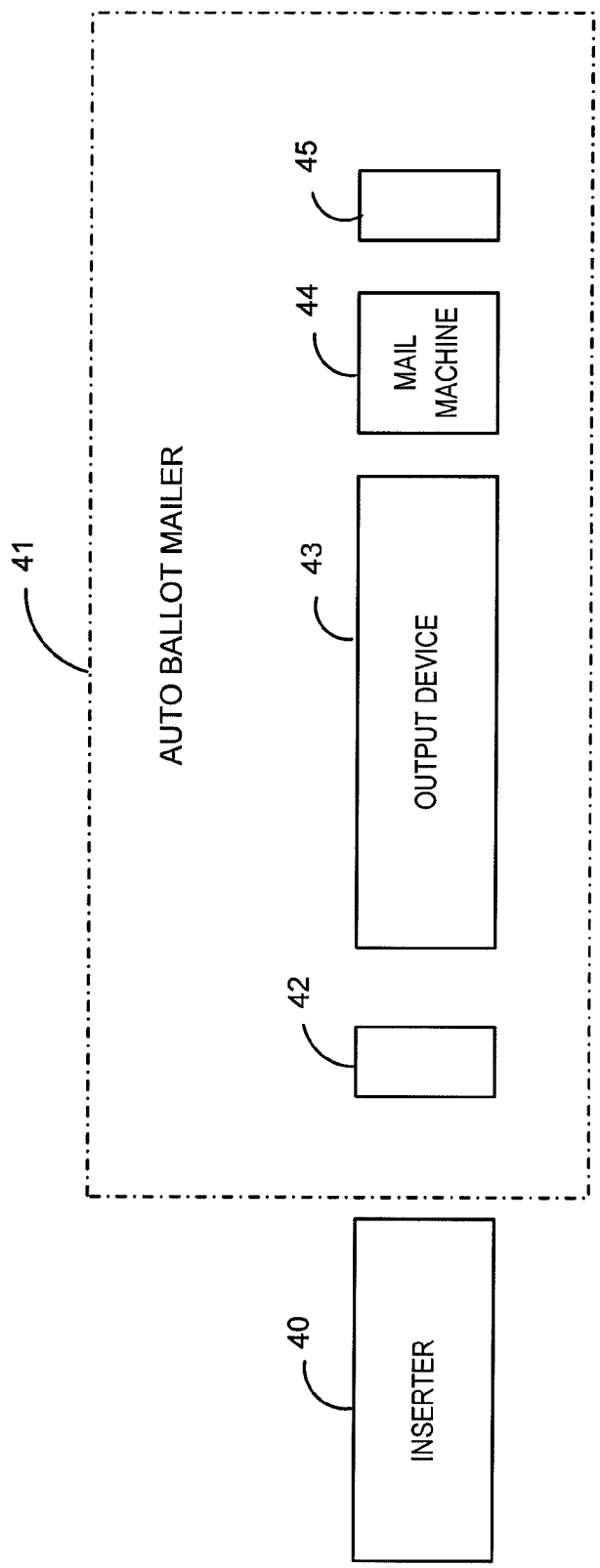
FIG. 4 is a block diagram depicting components for creating outbound mail pieces.
Figure 6:
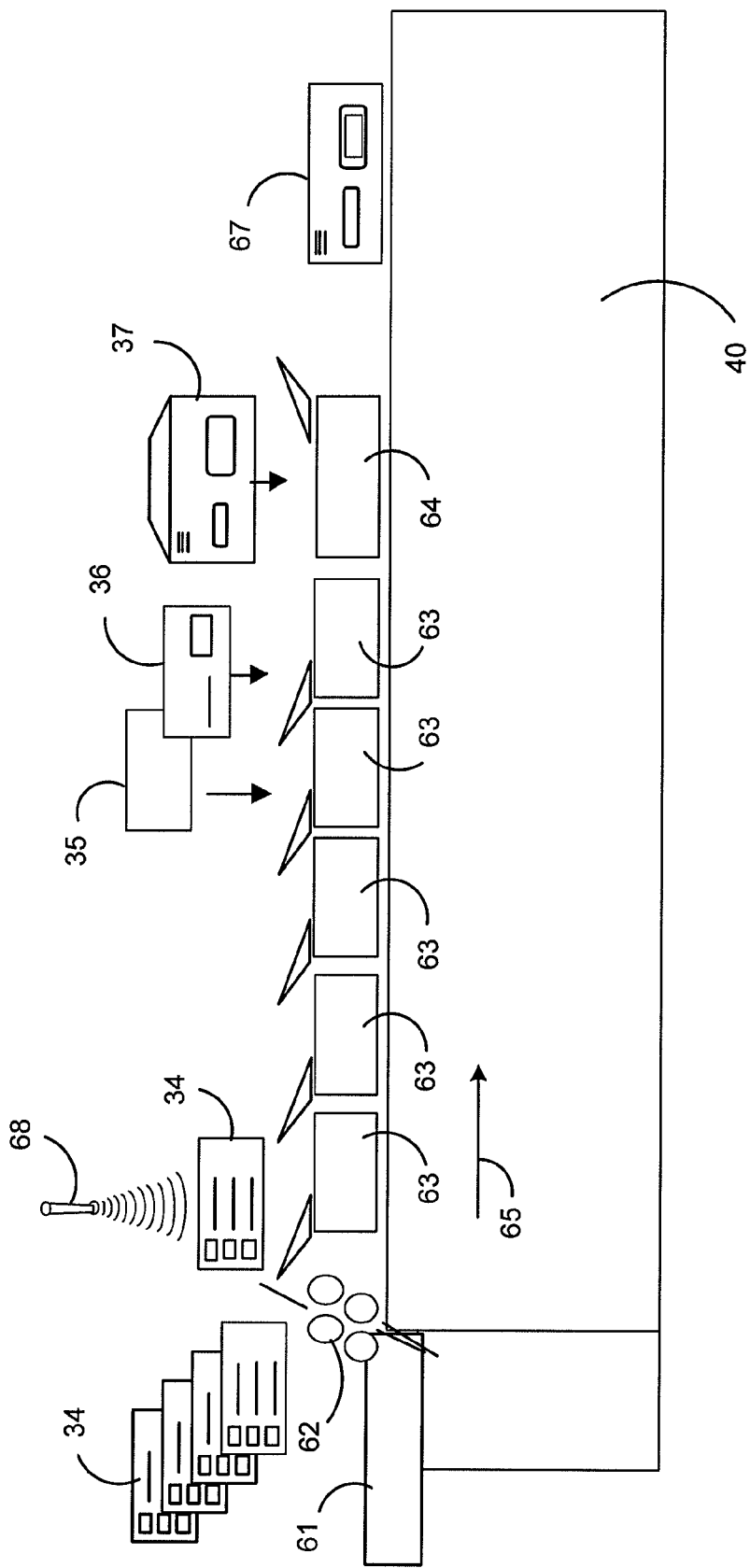
FIG. 6 depicts an inserter for use in preparing outbound mail pieces.

FIG. 4 depicts the major components for a system to produce outbound ballot packages to be sent to voters. A first component is an inserter 40 that operates to collect and insert the package contents 34, 35, and 36 into carrier envelope 37. For low volume of mail the inserter 40 can be a table top inserter system such as the DI800 model from Pitney Bowes Inc., for higher volumes the inserter 40 can be a faster machine such as the DM10 or Series 8 model inserters from Pitney Bowes. Details of inserter 40 are depicted in FIG. 6.

If inserter 40 is a table-top inserter, that embodiment will likely require that the inserted ballot packages be carried from the output of inserter 40 to an input feeder 42 of an auto ballot mailer machine 41. For the higher volume applications, the inserter 40 will be directly interfaced to the auto ballot mailer machine 41 and the feeder 42 will instead be a transport interface transport linking the two.

An important aspect of the present invention is that the inserter 40 need not have any intelligence about whom the ballot will be sent to. The processes requiring intelligence, such as matching a voter with the ballot, are all carried out within a relatively short span of equipment located at the end of the process. By limiting the intelligence to the last part of the process, the opportunity for errors to occur is limited to a small portion of the equipment. In this way integrity is more easily maintained. Also, this approach allows conventional inserter equipment to be easily adapted for use with voting by mail without any special programming for intelligence.

Figure 7:
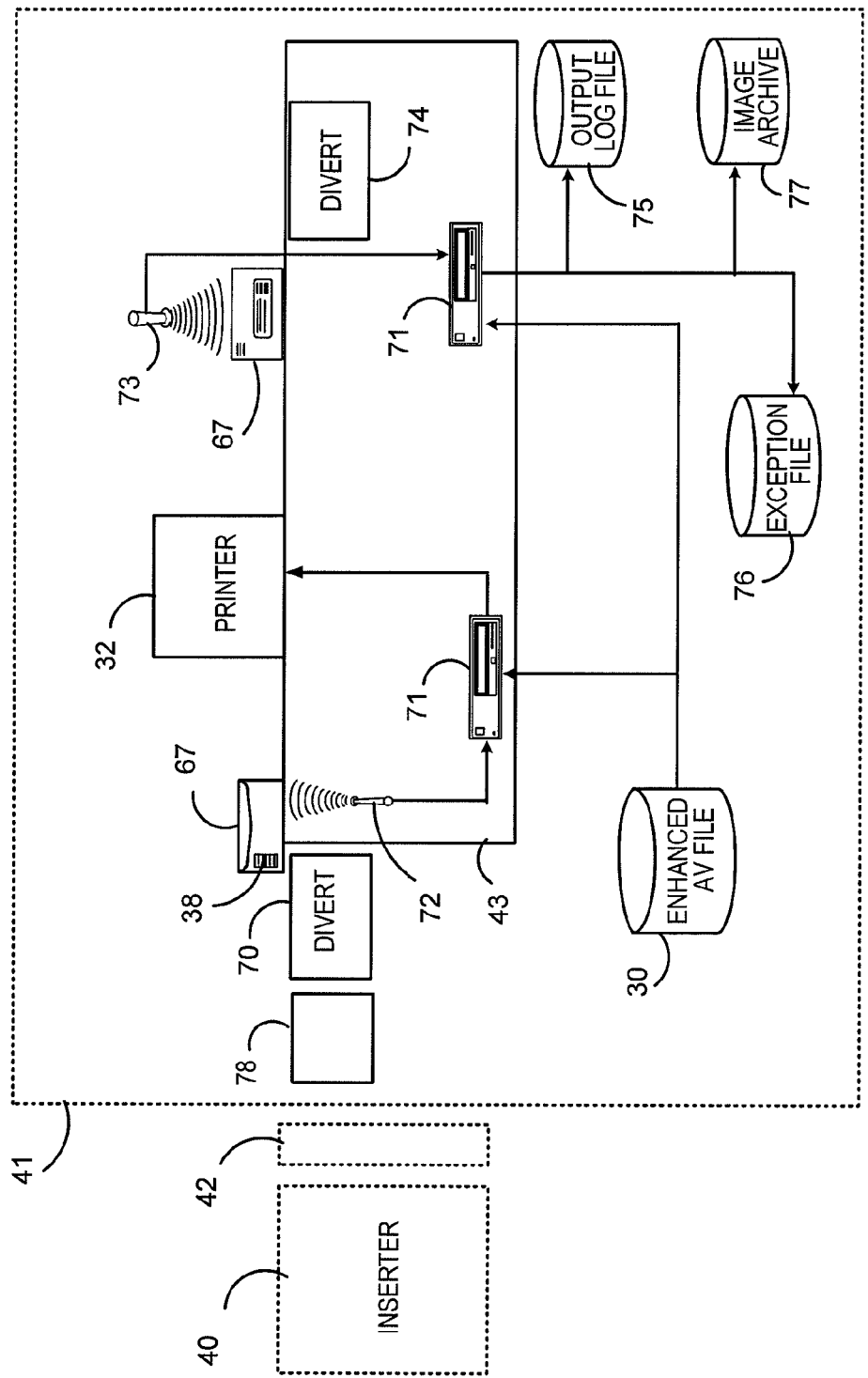
FIG. 7 depicts a mail processing device for use downstream of the inserter for preparing outbound mail pieces.

It is the output device 43 that includes the scanning equipment and the intelligence to determine who will be receiving the ballot packages. The output device 43 (describe further in FIGS. 7-8) prints the recipient's address on the package. The output device 43 further scans unique identification markings from the package and associates the unique identification markings with the voter's file. This allows the unique identification markings to be used later on to track the ballot during postal delivery.

Downstream of the output device 43, a mailing machine 44 may be used to print the appropriate postage mark on the carrier envelope 37. Mailing machine 44 would preferably be a Pitney Bowes DM series postage meter. Finally, an output stacker 45 can be used to neatly stack the finished ballot packages to be transferred to the postal service.

Figure 5:
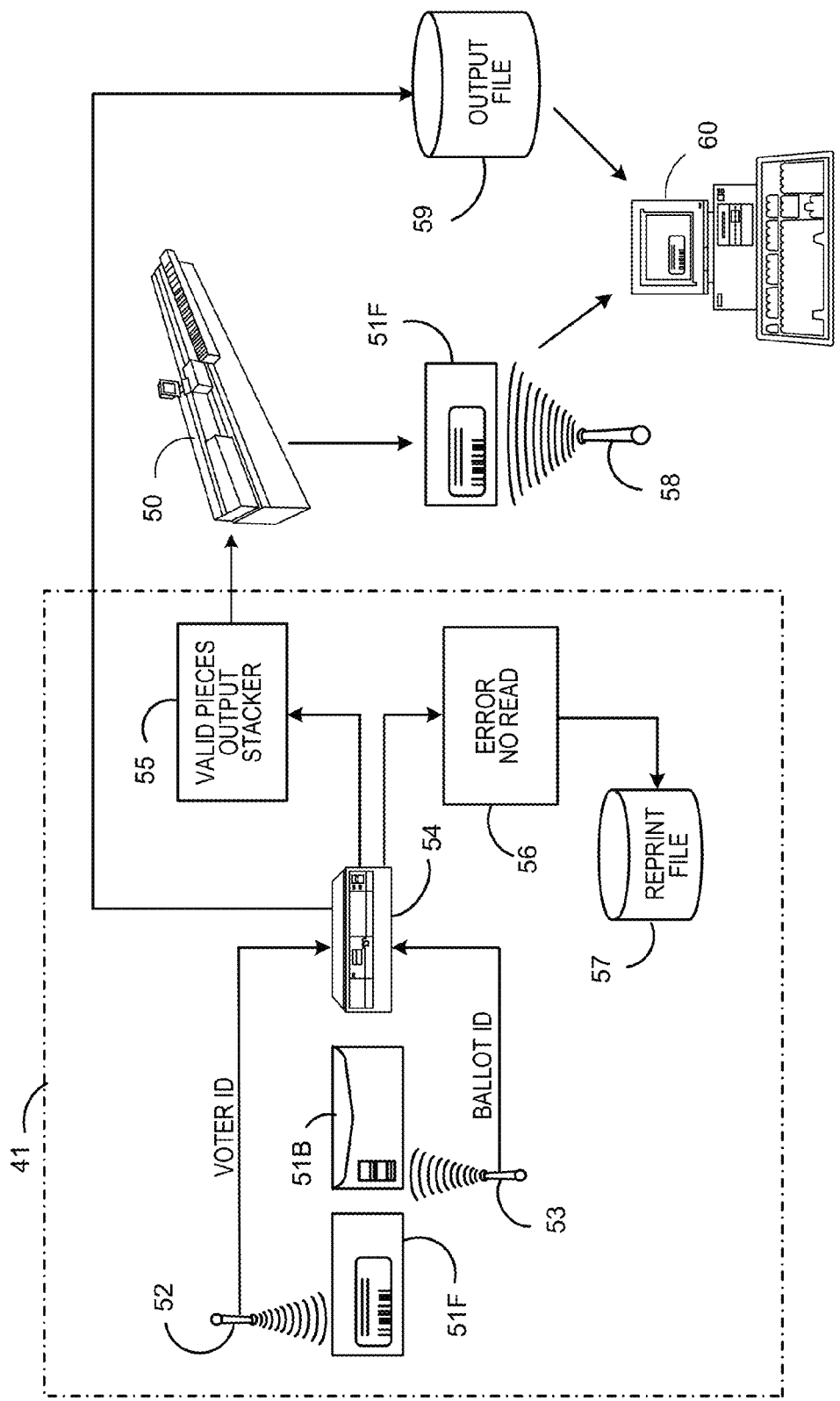
FIG. 5 depicts an integrity checking system for outbound mail pieces.

FIG. 5 depicts details of an integrity checking system that is preferably associated with the auto ballot mailer machine 41. In this example, ballot package 51 has a front side 51F and a backside 51B. This integrity system is used after the voter information has been printed onto the ballot package 51, through the front window FW onto the back of the enclosed reply envelope 36.

A scanner 52, positioned above the transported ballot package 51 in this embodiment, scans voter identification information from the front 51F of the ballot package and provides the information to the system controller computer 54. A second scanner 53, in this embodiment positioned below the transported ballot package 51, scans the ballot style code through the back window of the carrier envelope on side 51B. The system controller computer 54 confirms from the enhanced AV file 30 that the voter identification obtained from scanner 52 correctly corresponds to the ballot style code read with the second scanner 53. Preferably, an integrity check record for each ballot package is sent to an output file 59.

If the ballot style does not correctly match the voter, an error signal 56 is generated, and record is created in a reprint file 57 indicating that the ballot package for that particular voter must be recreated. Mail pieces 55 that pass the validity test are transferred to an output stacker device 50. Output stacker device 50 can perform sorting on the finished ballot packages to receive optimum postal discounts. Also, a camera 58 on sorter 50 can be used to capture an image of the front 51F of the ballot package. The captured image can then be associated with the output file 59 so that an operator at a workstation 60 can view the integrity status information from output file 59 along with an image of the ballot package.

In the preferred embodiment described above, camera 58 is a high speed imaging camera such as those known in the art and available from Lake Image Systems, Ltd. from the United Kingdom. Controller computer 54, or any computer described herein, is preferably a conventional personal computer. Alternatively, the computer can be a dedicated processor associated with the corresponding equipment. Sorter 50 is preferably a high-speed, high volume, sorter such an Olympus model sorter available from MailCode, Inc. of Lafayette, Ind.

FIG. 6 shows a side-view diagram of a representative inserter machine 40 for use with the present invention. Pre-printed ballots 34 are placed in a feeder 61. Typically, ballots 34 having the same style will be processed in a group together. A folder 62 folds the ballot 34 so that it will fit in the carrier envelope 37. As the ballots 34 are conveyed along conveyor direction 65, a scanner 68 can be used to scan the style code information from the ballots 34. Depending on the scanned style code, different inserts 35 from feeders 63 can be collated with the ballot 34 for insertion. Return envelope 36 is also fed onto the conveyor 65 from a feeder 63. Finally, a carrier envelope 37 is fed into insertion station 64, and the collated ballot 34, inserts 35 and reply envelope 36 are inserted into the carrier envelope 37 to form an outgoing ballot package 67.

Stuffed ballot packages 67 from inserter 40 are transferred directly or manually to the auto ballot mailer machine 41. In the preferred embodiment, ballot packages 67 received from transport or feeder 42 are processed by a device 78 to verify that the package 67 includes the expected quantity of contents. Device 78 is preferably a thickness detector that will generate an error signal if the package 67 is too thick. A package 67 that is too thick might indicate that more than one ballot 34 is enclosed within, and it is undesirable that any voter receive more than one ballot. Device 78 could also be a scale that dynamically weighs packages 67 and compares their weight against expected criteria. When an error is detected by device 78, a diverter 70 removes the flawed package from further processing.

Prior to reaching the auto ballot mailer machine 41, the stuffed ballot packages 67 do not include any indication of an intended recipient. Within its discrete processes the ballot mailer machine 41 identifies the intended recipient and marks the ballot package 67 accordingly. A scanner 72 reads the style code 38 showing on the back of the ballot package 67 and transmits the style to controller computer 71. The controller computer 71 accesses the enhanced AV file 30 that includes lists of voters, and the corresponding ballot types that they are supposed to receive. The controller computer 71 selects a next voter with a ballot type corresponding to the scanned style code 38, and instructs the printer 32 to print the voter's name, address, voter ID code, and other tracking information onto the back of the reply envelope, through the open window FW in the front of the ballot package 67.

After printing, an audit camera 73 captures data printed on the ballot package 67 and sends the data to the controller computer 71. Controller computer 71 validates that the decoded data includes the voter the data expected for that package, and updates the status in the output log file. If an error is detected, controller computer 71 controls diverter 74 to remove the erroneous package.

Also, audit camera 73 can be used to capture an image of the face of the ballot package 67. This image is associated with the voter record and is stored in the image archive 77. After processing a run of ballot packages, the controller computer 71 checks the enhanced AV file 30 to determine voters for whom a finished and validated ballot package has not been prepared. The list of unserved voters is stored in an exception file 76 which is used in turn to create ballots on demand of the appropriate type needed. Print information for creating the replacement ballots is included in the ballot on demand file 29.

Scanner 72 and audit camera 73 are preferably high speed image capture cameras such as those from Lake Image Systems. The controller computer 71 is a conventional personal computer. Controller computer 71 may also be more than one computer that shares information between different nodes of the system. Printer 32 is a conventional address and/or barcode printer such as the kind available from Prism, Inc. of Duluth, Ga.

Figure 8:
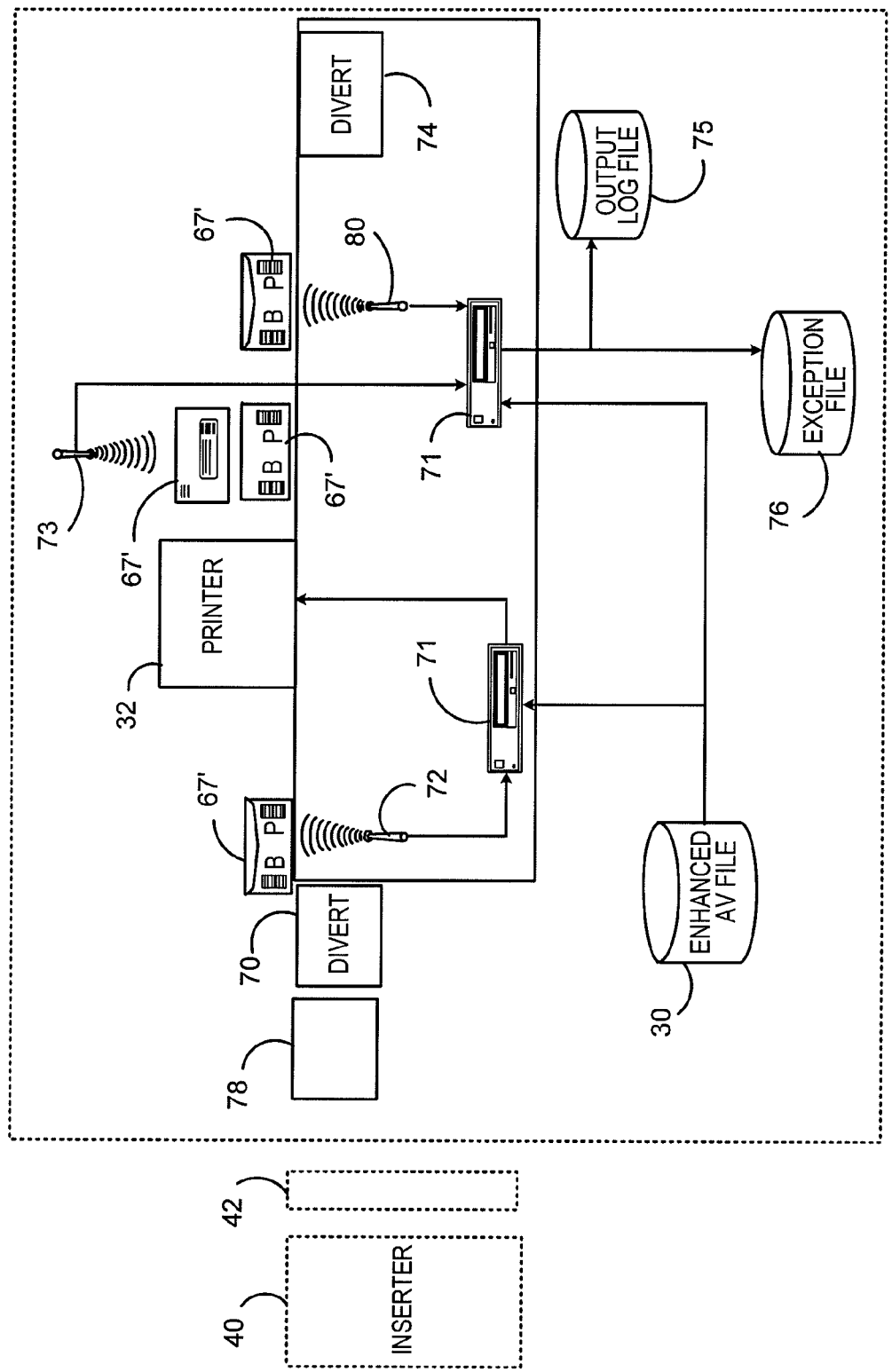
FIG. 8 depicts a mail processing device with enhanced tracking capabilities.

FIG. 8 depicts an embodiment using enhanced tracking feature for ballot packages 67' that are configured as shown in FIG. 3B. Ballot package 67' includes a style barcode B and a tracking barcode P, that are visible on the backside of ballot package 67'. Tracking barcode P is printed on the front face of a reply envelope that is enclosed within the ballot package 67', and is intended to be used to track the return ballot as it is delivered from the voter back to the voting authority. Scanner 80 scans code P and the controller computer 71 and the code is then associated with the voter record in the output log file 75.

In the figures, barcodes B and P are depicted as having a particular orientation with respect to the mail packages. However, it will be understood by one of skill in the art that the barcodes can have any orientation, and be read. In particular, in an alternative embodiment, the barcodes may be turned by ninety degrees so that the long dimension is parallel to the direction of travel of the envelopes.

Inbound Ballot Package Processing

Figure 9:
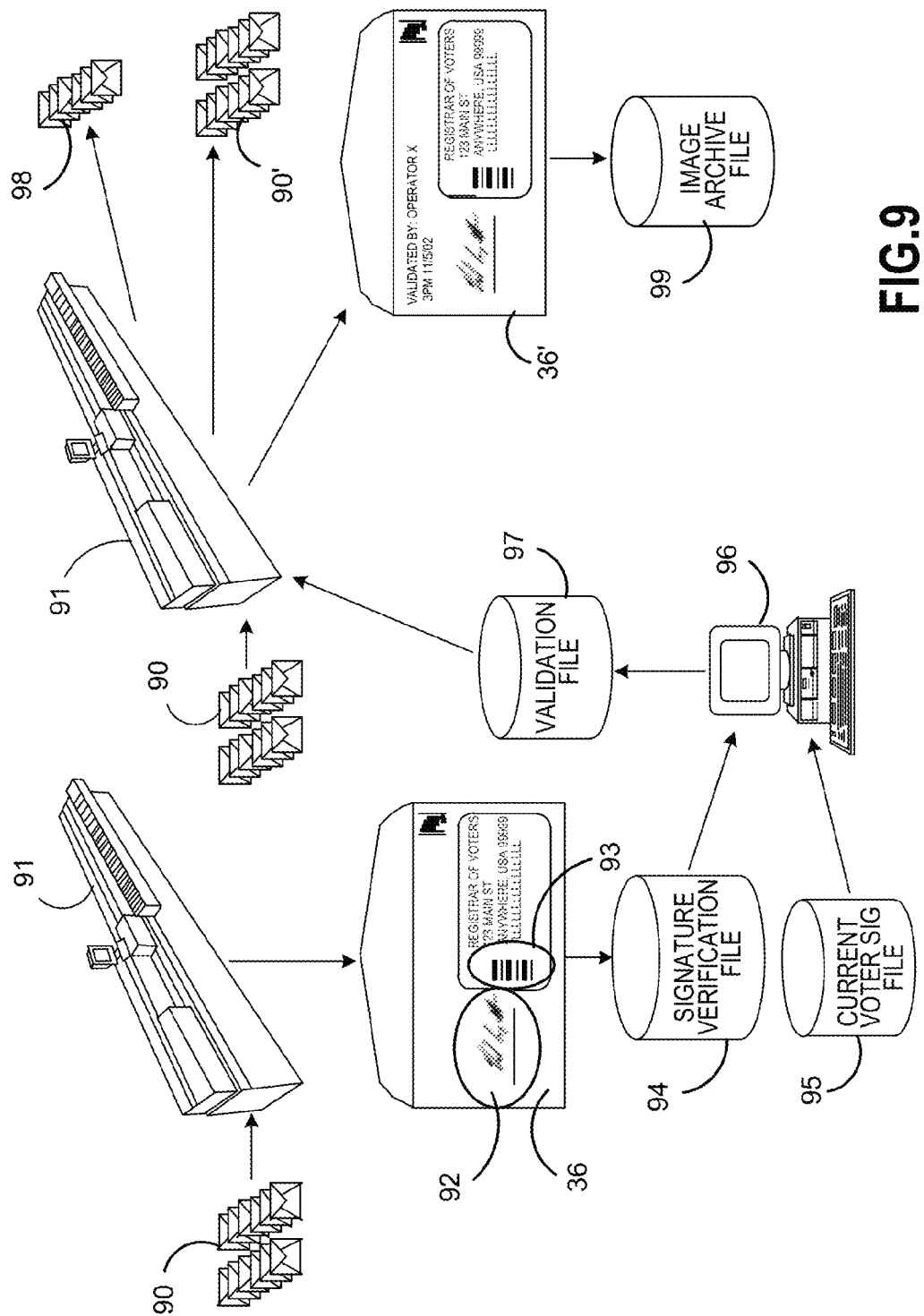
FIG. 9 depicts a flow diagram for processing inbound ballot envelopes.

FIG. 9 shows an overall flow diagram for processing of returned ballot mail pieces in accordance with the present invention. Incoming envelopes 90 are loaded into a sorter machine 91. Sorter machine 91 may be a conventional sorting machine such as an Olympus model sorting machine available from MailCode Inc. of Lafayette Ind. Sorter machine 91 includes an optical scanner to capture a voter identification code 93 and the voter verification signature 92 from the incoming reply envelope. As the incoming reply envelopes 90 are processed through the sorter 91, a signature verification file 94 is created in which the captured signature 92 images are associated with the corresponding voter identification obtained from the code 93.

The captured images from the signature verification file 94 and a recorded image of the voters signature from the current voter signature file 95 are transmitted to a workstation 96 for validation. In the preferred embodiment, an operator compares the signature from the envelope with the signature from the voter's record. Alternatively, the signature from files 94 and 95 could be compared with known signature analysis software. The voter's electronically stored signature in file 95 is obtained at the time the voter registers to vote.

Based on the comparison done at computer work station 96, a validation file 97 is generated. For each envelope 36 for which the signature was examined, the validation file 97 indicates whether the validation was successful or not. The validation file 97 is provided to sorter 91 which again processes the entire set of envelopes 90. Envelopes 90' that were successfully validated are separated from unvalidated envelopes 98. Unvalidated envelopes 98 must be specially handled to determine if they should be counted.

Preferably, the sorter 91 also includes a printer that prints a time and date stamp and an operator identification for the validation. Also, an image of the face of the validated envelope 36' can be captured and stored in an image archive file for future reference.

Figure 10:
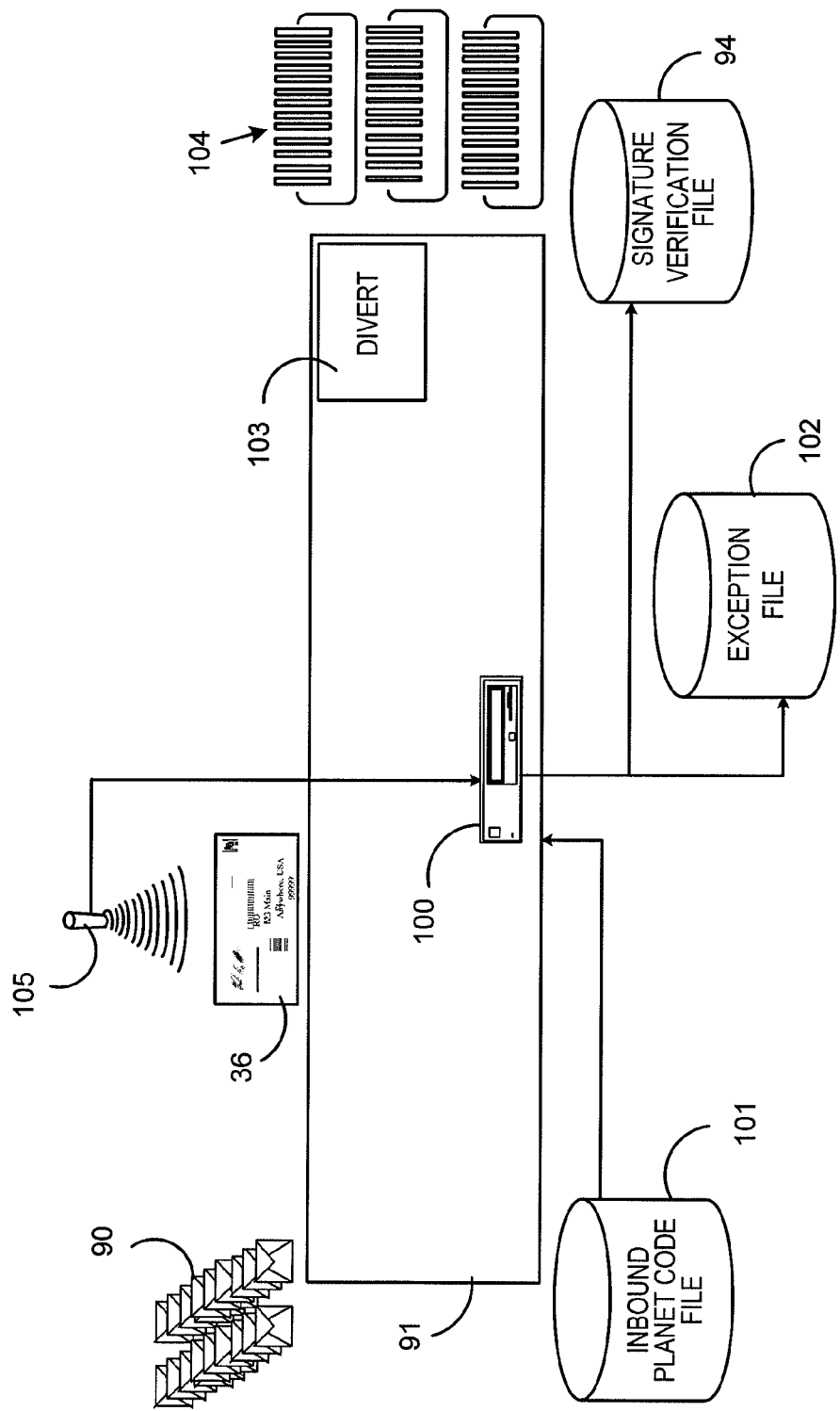
FIG. 10 depicts first pass processing of the inbound ballot envelopes.

FIG. 10 provides a block diagram of the sorter 91 for use with the system shown in FIG. 9. A camera 105 is positioned to capture the image of envelope 36, including the signature 92 and the voter identification code 93. A controller computer 100 uses an inbound PLANET code file to associate the scanned voter identification number with a particular voter. Once the voter is identified, the appropriate signature image is retrieved from the signature verification file 94. Preferably, the signature capture file 94 stores signature images in TIF format, indexed by voter identification data. For unrecognized codes, a record is made in the exception file 102 noting discrepancies between the PLANET code scans and inbound pieces. After the initial pass on the documents the mail pieces 90 are stacked in bins 104 and staged for subsequent processing.

Figure 11:
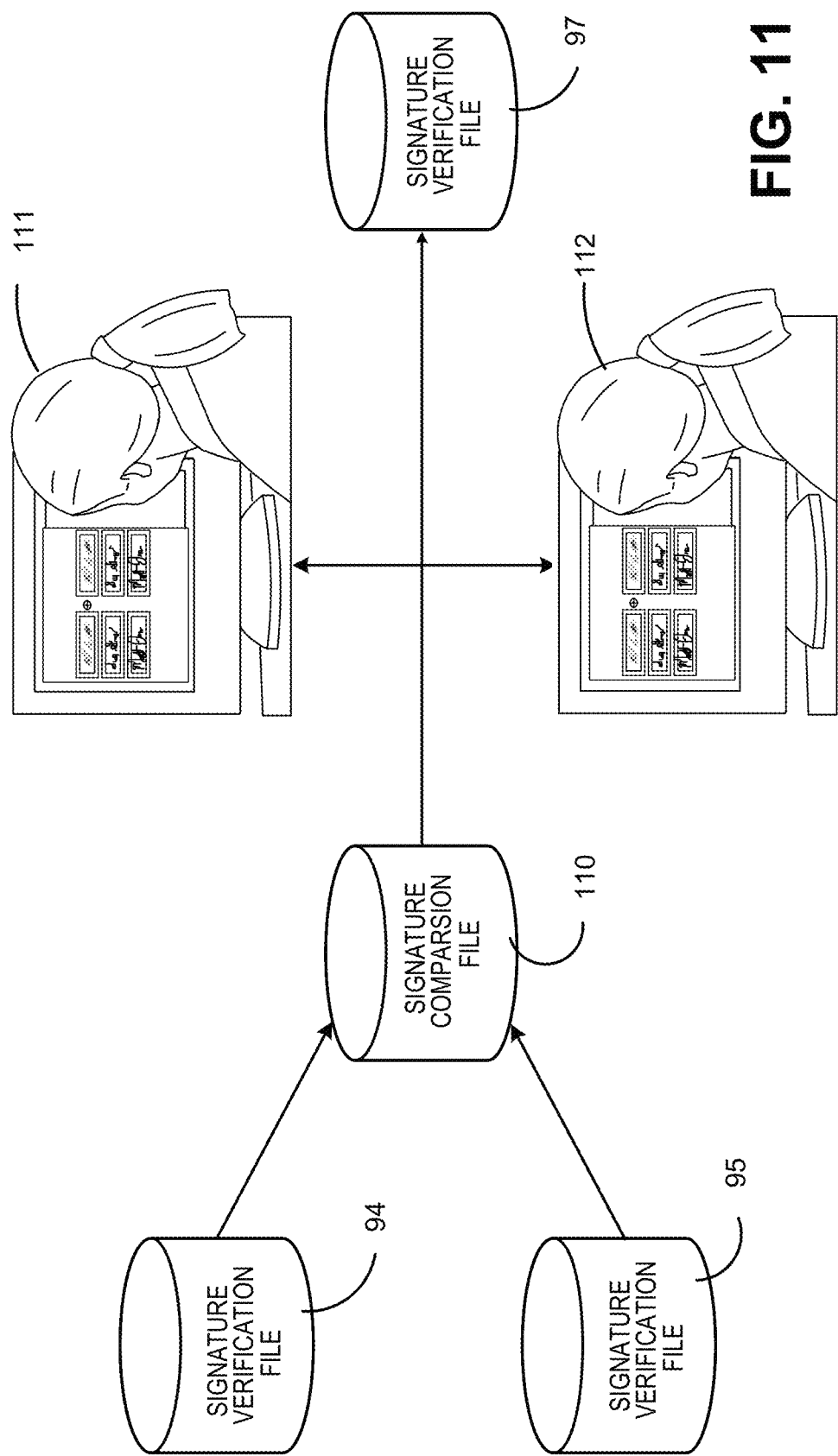
FIG. 11 depicts a process for comparing ballot envelope signatures to voter signature records.

FIG. 11 provides a more detailed depiction of the comparison process, as carried out by human operators. The captured signatures from the signature verification file 94 and the stored voter signatures from the voter signature file 95 can be combined into a single signature comparison file 110. Using the signature comparison file 110, operators at work stations 111 and 112 can visually compare the envelope signature with the voter's recorded signature. Through a computer interface, such as a keyboard or a mouse, the operator create a record of the disposition of the comparison process, and such records are stored in the signature verification file 97.

Figure 12:
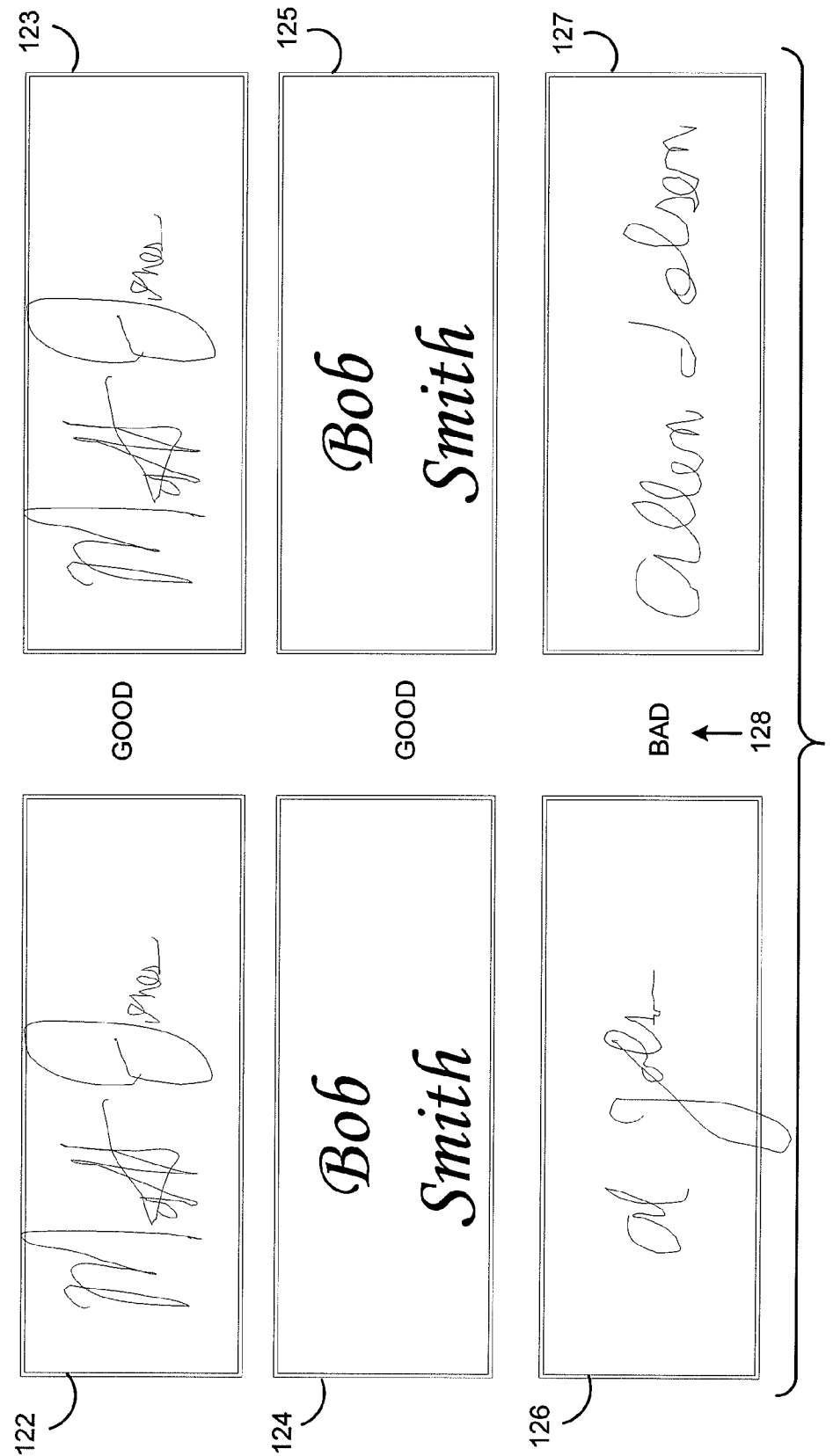
FIG. 12 depicts exemplary signatures displayed for comparison by the inbound ballot envelope processing system.

FIG. 12 shows exemplary pairs of signatures 122-127 as they might be displayed on an input screen for an operator. Preferably using a single keystroke, the operator will indicate whether the match is valid. Such indication would be shown, for example in region 128.

Figure 13:
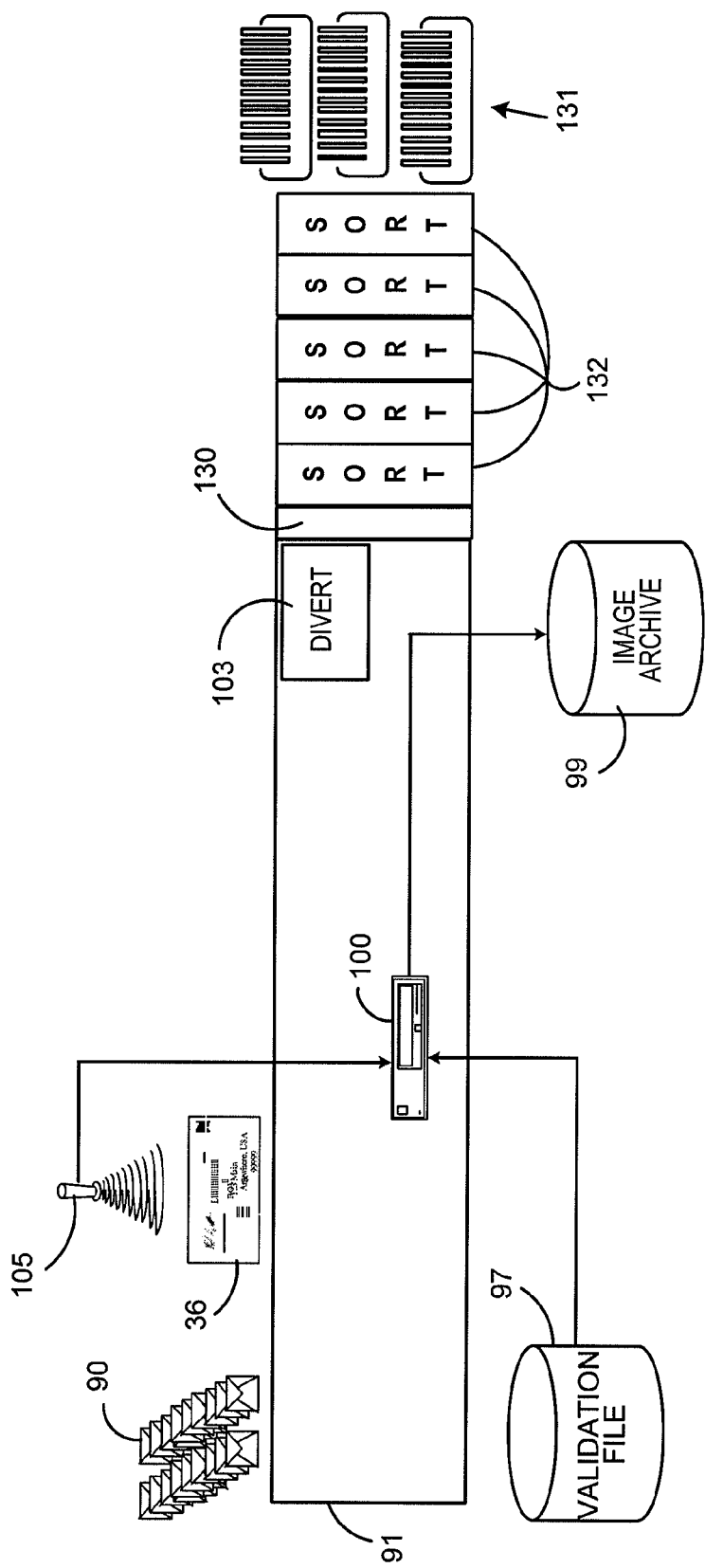
FIG. 13 depicts processing of inbound ballot envelopes in a second pass, after signature comparison.

FIG. 13 depicts features of the sorter 91 used in connection with the second pass of envelopes 90, after the signature validation review. Once again the identification codes 93 on envelopes 36 are scanned by camera 105. Controller computer 105 looks up whether the identification code corresponds to a validated or unvalidated mail piece in the validation file 97. An image of the envelope 36 may also be captured and stored in the image archive 99. Unvalidated pieces are diverted by diverter 103 for exception handling. The remainder of validated pieces are opened in opening station 130 and are sorted into sortation bins 132 based on the voting authority requirements. Such requirements might separate voters by districts, or sort quantities of envelopes to be handled by different groups of workers. Sorted pieces 131 can then be removed from the sorter 91 for subsequent counting.

Outbound and Inbound Tracking

Figure 14:
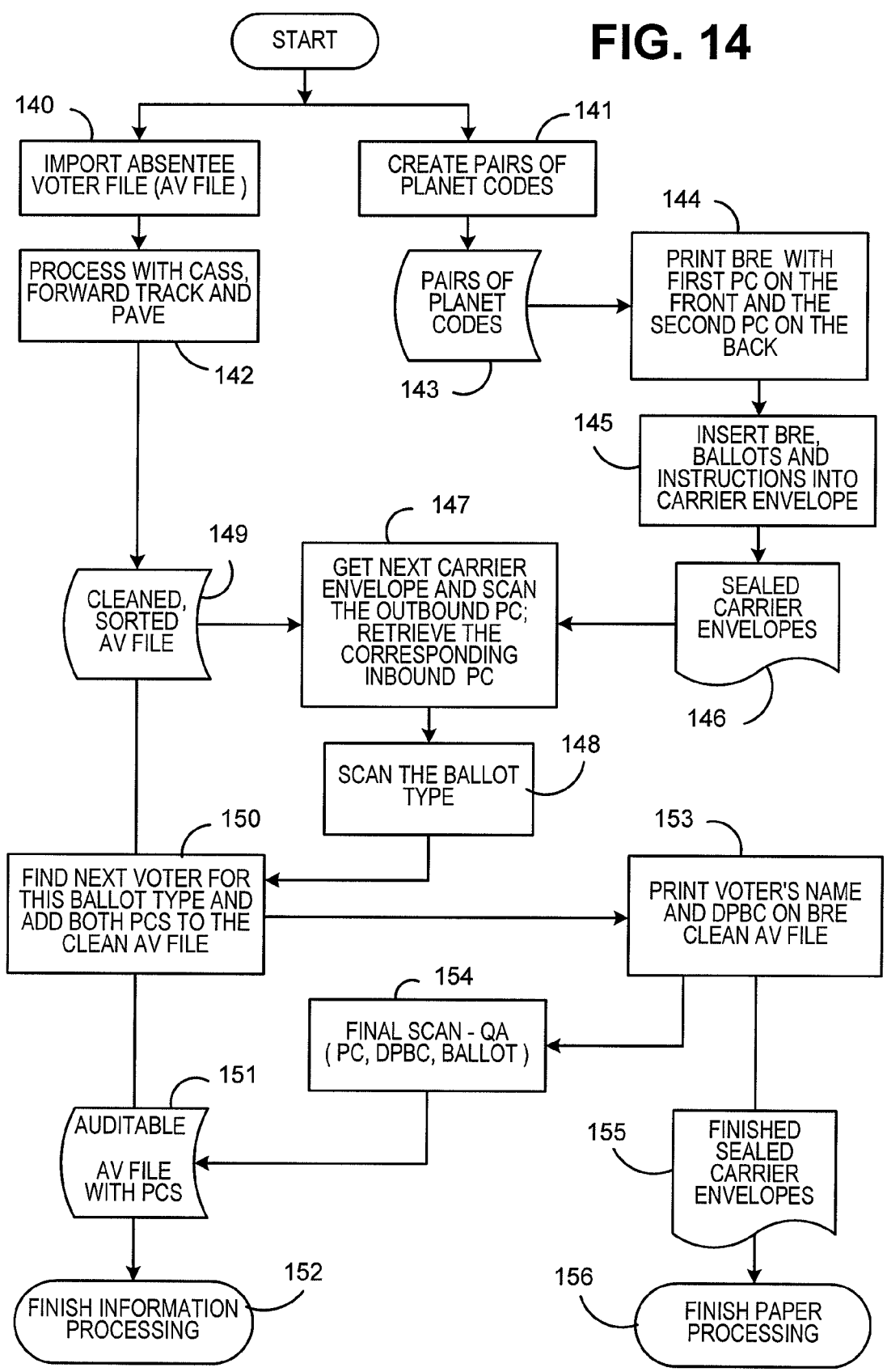
FIG. 14 depicts a flow diagram for providing and using PLANET codes to track outbound and return ballot mailpieces.

FIG. 14 depicts a flow diagram of steps for creating ballot packages that include tracking codes for both outbound and inbound mail. At step 140, the absentee voter (AV) file is imported from the voting authority for use with the automated system. At step 142 the AV file is processed with address cleansing software (CASS), move update software (Forward Track from Pitney Bowes), and mail presorting software (USPS certified PAVE software).

At step 141, the process for applying the tracking codes begins by creating a pair of PLANET codes. The identity of the related pair of codes is stored for future use. Preferably, the codes may also be related to each other by a predetermined formula. For example, the second code may be one digit greater than the first.

PLANET codes are selected because that is the barcode format used by the United States Postal Service to allow tracking of mail pieces. However, any other type of code could be substituted. Once the pairs of PLANET codes 143 are created, a first PLANET code is printed on the front of the ballot return envelope. The second PLANET code is printed on the back of the ballot return envelope. At step 145 the ballot package contents, with the return envelope, are inserted into a carrier envelope.

At a next processing step 147, the second PLANET code, now the outbound tracking code, is scanned through a front opening in the sealed carrier envelopes 146. Next, the ballot style code is scanned from the ballot through another opening on the back of the carrier envelope at step 148. At step 150, the next voter is selected from the cleaned and sorted AV file 149 whose required ballot style matched the ballot type scanned in step 148. The selected voter's name, address and delivery point bar code are printed onto the back of the return envelope through a window in the carrier envelope (step 153).

Optionally, a final scan is performed after printing to capture the outbound PLANET code, the delivery point barcode, and the ballot style (step 154). This scan is used to verify that the information all matches as expected, and to update an audit record 151. Finished and sealed envelopes 155, are then ready for transmittal to a delivery service.

Figure 15:
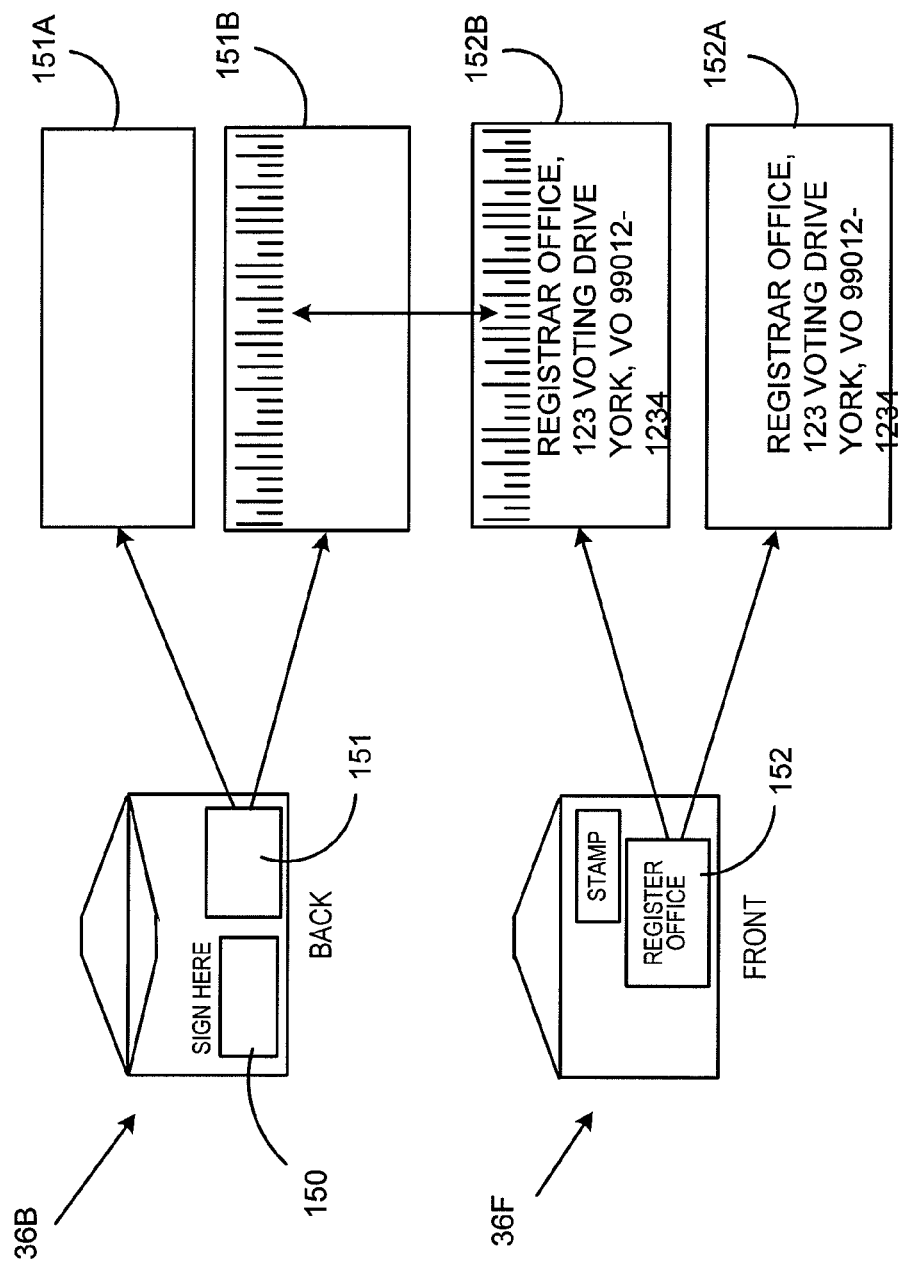
FIG. 15 depicts an arrangement of return envelope components for use with enhanced tracking capabilities.

FIG. 15 depicts configurations of the reply envelope for use in connection with the inbound and outbound tracking capability. The back side 36B of return envelope 36 includes a signature area 150 for the voter's validation signature. Next to that is the voter's address region 151 where the voter's name and address will be printed after the return envelope 36 has been placed in the carrier envelope. On the front side 36F of the reply envelope is the return address region 152 indicating where the return envelope 36B is to be delivered.

In a first embodiment of the dual tracking code feature, the paired tracking codes are not pre-printed on the reply envelopes 36. Thus, exemplary regions 151A, and 152A have blank areas where PLANET codes can be printed later on. In the preferred embodiment, however, the return envelope 36 has paired PLANET codes pre-printed in the voter address region 151 and the return address region 152, as shown in examples 151B and 152B.

FIG. 16 depicts configurations of the carrier envelope for use with the dual tracking code embodiment. The front 37F includes an open window 160 through which the voter's name and address can be printed onto the voter address region 151. In the embodiment where the dual codes are printed, then the outbound code is also printed through window 160.

The back 37B of the carrier envelope includes another window 161 through which the ballot style code can be read. For the embodiment where the dual codes need to be printed, then the inbound PLANET code is printed through window 163 onto the enclosed return envelope 36.

Next, in FIG. 17, the assembly of the outgoing ballot package is shown. Views 170 and 171 shows the assembly of components using the embodiment where the dual PLANET codes are pre-printed on return envelope 36. In this assembly, the style code will shown through the back of carrier envelope 37, and the voter address, and the outbound planet codes will show through the front opening of carrier envelope 37.

Views 172 and 173 show the assembly of ballot package components for the embodiment where the pair of PLANET codes is printed after assembly of the package. In this embodiment, the return envelope 36' has a large flap that folds across the main body of the ballot 34. A portion of the ballot 34 having the style code is folded under a lower portion of the return envelope 36' so that the style code will still be visible through window 161 when the assembly is inserted. Then the PLANET code pair can be printed with the outbound one printed through window 160, and the inbound one is printed through window 163.

In this embodiment, where printing occurs after assembly of the package, printing is required on both sides of the ballot package. This can be done by having printers both above and below the package transport. Alternatively, the transport can be modified in a known way to flip the packages to be printed on both sides.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A method for preparing mail packages to be sent to recipients, a mail package comprising a carrier envelope, a content document within the carrier envelope, the content document having a content style code printed on it, and a reply envelope within the carrier envelope, the method comprising:
   storing in a computer a list of recipients and for each recipient storing a corresponding content style for the recipient;
   feeding, using a mail package transport, the mail package in a series of mail packages;
   scanning, using a scanner arranged proximal to the transport, the content style code while the mail package is being fed;
   determining, using a computer, a content style for the content document from the scanned content style code;
   selecting, using the computer, a recipient having the corresponding content style from the list of recipients; and
   printing, using a printing mechanism coupled to the computer system, the recipient's name and address information onto an address area of the reply envelope.

2. The method of claim 1, wherein the mail package is transported with a front face up, and the step of scanning the content style code occurs from underneath the transported mail package, and the step of printing the recipient's name and address information occurs from above the transported mail package.

3. The method of claim 1, further comprising the step of preparing the mail package by inserting the content document and the reply envelope into the carrier envelope with an inserter machine, the step of inserting done independently of any determination of the recipient to whom the mail package will be sent.

4. The method of claim 1, further including a step of printing a postage indicia on a front face of the mail package.

5. The method of claim 1, further comprising automated sorting of finished mail packages to facilitate postal delivery.

6. The method of claim 1, further comprising:
   scanning an inbound identifier code from a front face of the reply envelope through an identifier code window on the carrier envelope; and
   associating the inbound identifier code with the corresponding recipient to whom the mail package is addressed.

7. The method of claim 6, wherein the inbound identifier code is a PLANET code.

8. The method of claim 1, wherein the step of printing further includes printing a machine readable recipient ID code along with the recipient name and address information.

9. The method of claim 8, wherein after the step of printing further includes a step of scanning the recipient ID code and scanning the content style code and checking that the content style correctly corresponds to the content style associated with the recipient, and outsorting the mail package if the scanned content style does not correspond to the content style associated with the recipient.

10. The method of claim 1, further including a step of measuring a thickness of the mail package, and if a thickness of the mail package does not comply with predetermined criteria, then outsorting the non-compliant mail package.

11. The method of claim 1, further including a step of weighing the mail package, and if the weight of the mail package does not comply with predetermined criteria, then outsorting the non-compliant mail package.

12. The method of claim 1, wherein the recipient is a voter and the content document is a ballot, for use in a vote-by-mail system.

13. The method of claim 12, further comprising a step of preparing the mail package by inserting the ballot and the reply envelope into the carrier envelope with an inserter machine, the step of inserting done independently of any determination of the voter to whom the ballot will be sent and wherein the step of inserting further includes placing a voting instruction document in between the ballot and the reply envelope that are inserted into the carrier envelope.

14. The method of claim 12, further including a step of capturing and storing an image of the front face of the mail package after the printing step.

15. The method of claim 14, further comprising the step of verifying that the recipient name and address information in the captured image match an expected set of information for that mail package.

16. A system for preparing mail packages to be sent to recipients, a mail package comprising:
   a carrier envelope having a front address window and a back window;
   a content document within the carrier envelope positioned at the back of the carrier envelope, the content document having a content style code printed on it, and the content style code being visible through the back window of the carrier envelope; and
   a reply envelope within the carrier envelope positioned at the front of the carrier envelope, the reply envelope having a recipient address area aligned with the address window on the front of the carrier envelope;
   the system comprising:
   a computer storing a list of recipients and for each recipient storing a corresponding content style for the recipient;
   a mail package transport;
   a scanner arranged proximal to the transport and scanning the content style code while the mail package is on the transport; the scanner coupled to the computer system, the computer system determining the content style for the content document from the scanned content style code and selecting a recipient having the corresponding content style from the list of recipients; and
   a printing mechanism contiguous to the transport and coupled to the computer system and arranged to print the recipient's name and address information, received from the computer system, onto the address area of the reply envelope.

17. The system of claim 16, wherein the mail package is transported front face up, and the scanner is positioned underneath the transported mail package for reading the content style code, and wherein the printing mechanism, for printing the recipient's name and address information, is positioned above the transported mail package.

18. The system of claim 16, further comprising an inserter machine arranged to prepare the mail package by inserting the content document and the reply envelope into the carrier envelope, the inserter machine performing insertions independently of any determination of the recipient to whom the mail package will be sent.

19. The system of claim 16, further including a thickness detecting device and an outsorting device in line with the transport, and if a thickness of the mail package does not comply with predetermined criteria provided by the computer system, then outsorting the non-compliant mail package with the outsorting device.

20. The system of claim 16, further including a scale and an outsorting device in line with the transport, the scale weighing the mail package, and if the weight of the mail package does not comply with predetermined criteria, provided by the computer system, then outsorting the non-compliant mail package with the outsorting device.

21. The system of claim 16, further including a postage meter in line with the transport and arranged to print a postage indicia on the front face of the mail package.

22. The system of claim 16, further comprising an output sorter at the end of the transport, the sorter including bins for separating finished mail packages into groups to facilitate postal delivery.

23. The system of claim 16, wherein the mail package further comprises:
- an inbound identifier code printed on the front face of the reply envelope; and
- an identifier code window on the back of the carrier envelope; and whereby the reply envelope and content document are positioned within the carrier envelope in an offset manner such that the content style code shows through the back window, and the inbound identifier code shows through the identifier code window;
the system further comprising a code scanner arranged contiguous to the transport to scan the inbound identifier code from the reply envelope through the identifier code window and coupled to the computer system which stores an association between the inbound identifier code and the corresponding recipient to whom the mail package is addressed.

24. The system of claim 16, wherein the printing mechanism further prints a machine readable recipient ID code along with the recipient name and address information provided by the computer system.

25. The system of claim 24, wherein downstream of the printing mechanism one or more verification scanners are located contiguous to the transport and are arranged to scan the recipient ID code and the content style code, the one or more verification scanners coupled to the computer system which is programmed to check that the scanned content style correctly corresponds to the content style associated with the recipient, and the computer system controlling an outsorting mechanism to outsort the mail package if the scanned content style does not correspond to the content style associated with the recipient.

26. The system of claim 16, wherein the recipient is a voter and the content document is a ballot, for use in a vote-by-mail system.

27. The system of claim 26, wherein the inserter machine is further arranged to insert a voting instruction document in between the ballot and the reply envelope that are inserted into the carrier envelope.

28. The system, of claim 26, further including a camera arranged contiguous to the transport to capture and store an image of the front face of the mail package in the computer system after printing.

29. The system of claim 28, wherein the computer system is further programmed to verifying that the recipient name and address information in the captured image matches an expected set of information for that mail package.

30. A method for preparing mail packages to be sent to recipients, a mail package comprising a carrier envelope, a content document within the carrier envelope, the content document having a content style code printed on it, and a reply envelope within the carrier envelope, the method comprising:
- storing in a computer a list of recipients, comprising storing a corresponding content style for each recipient;
- preparing the mail package, comprising inserting the content document and the reply envelope into the carrier envelope, wherein inserting is carried out independently of any determination of the recipient to whom the mail package will be sent;
- feeding, using a mail package transport, the mail package in a series of mail packages;
- scanning, using a scanner arranged proximal to the transport, the content style code while the mail package is being fed;
- determining, using a computer, a content style for the content document from the scanned content style code;
- selecting, using the computer, a recipient having the corresponding content style from the list of recipients; and
- printing, using a printing mechanism coupled to the computer system, the recipient's name and address information onto an address area of the reply envelope.

* * * * *